(12) United States Patent
Hiraoka

(10) Patent No.: US 11,663,413 B2
(45) Date of Patent: May 30, 2023

(54) DIALOG APPARATUS, DIALOG SYSTEM, AND COMPUTER-READABLE RECORDING MEDIUM

(71) Applicant: NEC Corporation, Tokyo (JP)

(72) Inventor: Takuya Hiraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 773 days.

(21) Appl. No.: 16/492,664

(22) PCT Filed: Mar. 13, 2017

(86) PCT No.: PCT/JP2017/010044
§ 371 (c)(1),
(2) Date: Sep. 10, 2019

(87) PCT Pub. No.: WO2018/167830
PCT Pub. Date: Sep. 20, 2018

(65) Prior Publication Data
US 2020/0050669 A1 Feb. 13, 2020

(51) Int. Cl.
*G06F 40/30* (2020.01)
*G06F 16/23* (2019.01)
(Continued)

(52) U.S. Cl.
CPC .......... *G06F 40/30* (2020.01); *G06F 16/2379* (2019.01); *G06N 5/04* (2013.01); *G06N 20/00* (2019.01); *G10L 15/22* (2013.01)

(58) Field of Classification Search
CPC ............. G06F 16/2379; G06F 16/3329; G06F 16/3344; G06F 16/90332; G06F 40/30; G06N 5/04; G06N 20/00; G10L 15/22
See application file for complete search history.

(56) References Cited

U.S. PATENT DOCUMENTS

2014/0272884 A1* 9/2014 Allen .................. G09B 7/04
434/322
2018/0232435 A1* 8/2018 Papangelis ............. G06N 5/027
(Continued)

FOREIGN PATENT DOCUMENTS

JP 2001117937 A 4/2001
JP 2012038287 A 2/2012
JP 2016085685 A 5/2016

OTHER PUBLICATIONS

Google Translation of JP 2012-038287, https://patents.google.com/patent/JP2012038287A/en?oq=JP+2012038287 (Year: 2012).*
(Continued)

*Primary Examiner* — Eric Yen
(74) *Attorney, Agent, or Firm* — Sughrue Mion, PLLC

(57) ABSTRACT

A dialog apparatus 100 is an apparatus for responding to a dialog act of a user. The dialog apparatus 100 is provided with: a policy unit 40 configured to set a score to each of response candidates included in a set of response candidates based on the state of a dialog being performed with the user and a policy parameter, and referring to the set scores, to select one of the response candidates as a dialog act of the dialog apparatus 100; and a policy parameter updating unit 60 configured to obtain a reward in the state of the dialog using a reward function that, as the reward, returns an evaluation of a behavior performed in a specific circumstance as a quantitatively represented numeric value, and to update the policy parameter based on the obtained reward.

9 Claims, 15 Drawing Sheets

(51) Int. Cl.
*G06N 20/00* (2019.01)
*G06N 5/04* (2023.01)
*G10L 15/22* (2006.01)

(56) References Cited

U.S. PATENT DOCUMENTS

2018/0232436 A1* 8/2018 Elson .................. G10L 15/22
2019/0370391 A1* 12/2019 Ezen Can ........... G06F 16/3329
2020/0142888 A1* 5/2020 Alakuijala .......... G06F 16/3338

OTHER PUBLICATIONS

PE2E Search translation of JP 2012-038287, 2012 (Year: 2012).*
M.-H. Su, K.-Y. Huang, T.-H. Yang, K.-J. Lai and C.-H. Wu, "Dialog State Tracking and action selection using deep learning mechanism for interview coaching,", 2016, 2016 International Conference on Asian Language Processing (IALP) pp. 6-9, doi: 10.1109/IALP.2016.7875922 (Year: 2016).*
Black, E., et al., "A Generative Inquiry Dialogue System", Proceedings of the 6th international joint conference on Autonomous agents and multiagent system, ACM, 2007, 8 pages.

* cited by examiner

DIALOG APPARATUS, DIALOG SYSTEM, AND COMPUTER-READABLE RECORDING MEDIUM

This application is a National Stage Entry of PCT/JP2017/010044 filed on Mar. 13, 2017, the contents of all of which are incorporated herein by reference, in their entirety.

TECHNICAL FIELD

The present invention relates to a dialog apparatus and a dialog method that perform discussion with a user and output an answer to a given question, and further relates to a computer-readable recording medium where a program for realizing these is recorded.

BACKGROUND ART

Commonly, an inquiry dialog is a dialog in which parties that share the same question or problem interact with each other in order to answer that question or problem. Also, an inquiry dialog system is a system provided with a function of performing an inquiry dialog with a user.

An example of a conventional inquiry dialog system is disclosed in Non-Patent Document 1. FIG. 15 is a block diagram showing an example of a conventional inquiry dialog system. As shown in FIG. 15, a conventional inquiry dialog system 200 includes an input acceptance unit 210, a dialog state updating unit 220, a response candidate generation unit 230, a policy unit 240, an output unit 250, and a knowledge recording unit 260.

The conventional inquiry dialog system 200 including such a configuration operates as follows. That is, the conventional inquiry dialog system 200 receives a user dialog act from outside, advances internal processing based on the user dialog act that was received, and outputs a system dialog act to the outside.

The specific procedure is as follows. First, the input acceptance unit 210 receives the user dialog act from outside, and transfers this user dialog act to the dialog state updating unit 220. Then, when the user dialog act is received from the input unit 210, the dialog state updating unit 220 updates a dialog state based on knowledge stored in the knowledge recording unit 260 and a system dialog act that has been output in the past by the policy unit 240, and transfers the updated dialog state to the response candidate generation unit 230.

The response candidate generation unit 230 outputs a system dialog act set based on the dialog state received from the dialog state updating unit 220, and the policy unit 240 outputs a dialog act to be output as a system dialog act based on the system dialog act set that was received from the response candidate generation unit 230. Note that the policy unit of the conventional inquiry dialog system selects the dialog act to be output as a system dialog act from the system dialog act set according to a static rule that has been defined by a person beforehand.

LIST OF RELATED ART DOCUMENTS

Non-Patent Document

Non-Patent Document 1: Black, Elizabeth, and Anthony Hunter. "A generative inquiry dialog system." Proceedings of the 6th international joint conference on Autonomous agents and multiagent system. ACM, 2007.

SUMMARY OF INVENTION

Problems to be Solved by the Invention

However, in the inquiry dialog system disclosed in the above Non-Patent Document 1, the policy unit operates based on a static rule that has been defined by a person beforehand, so there is a problem that it is not possible to adapt the behavior of the policy unit to the circumstances in which the system operates. This problem is specifically described below.

The circumstances in which the inquiry dialog system operates are diverse. For example, the type of user who uses the inquiry dialog system and the goal to be achieved by the inquiry dialog system are not necessarily limited to a single type of user or a single goal. Therefore, it is useful in practice that the inquiry dialog system can adapt to various circumstances.

However, in the inquiry dialog system disclosed in the above Non-Patent Document 1, the rules used in the policy unit are prepared in advance, with the person who is the designer assuming that the inquiry dialog system operates effectively in a specific circumstance, and the inquiry dialog system does not adapt to new circumstances that were not anticipated by the designer. Moreover, although it is conceivable to manually create rules that can cover various circumstances, this is generally difficult from the perspectives of development time and cost.

Object of the Invention

An example object of the invention is to provide a dialog apparatus, a dialog method, and a computer-readable recording medium that address the above problems, and can be adapted to creation of a policy corresponding to operating circumstances.

Means for Solving the Problems

In order to achieve the example object described above, a dialog apparatus according to an example aspect of the invention is an apparatus that responds to a dialog act of a user, the dialog apparatus including:

a policy unit configured to set a score to each of response candidates included in a set of response candidates based on the state of a dialog being performed with the user and a policy parameter, and referring to the set scores, to select one of the response candidates as a dialog act of the apparatus; and a policy parameter updating unit configured to obtain a reward in the state of the dialog using a reward function that, as the reward, returns an evaluation of a behavior performed in a specific circumstance as a quantitatively represented numeric value, and to update the policy parameter based on the obtained reward.

Also, in order to achieve the example object described above, a dialog method according an example aspect of the invention is a method of responding to a dialog act of a user, the dialog method including:

(a) a step of setting a score to each of response candidates included in a set of response candidates based on the state of a dialog being performed with the user and a policy parameter, and referring to the set scores, selecting one of the response candidates as a dialog act; and (b) a step of obtaining a reward in the state of the dialog using a reward function that, as the reward, returns an evaluation of a behavior performed in a specific circumstance as a quantitatively represented numeric value, and updating the policy parameter based on the obtained reward.

Furthermore, in order to achieve the example object described above, a computer-readable recording medium according to an example aspect of the invention includes a program recorded thereon for causing a computer to respond to a dialog act of a user, the program including instructions that cause the computer to carry out:

(a) a step of setting a score to each of response candidates included in a set of response candidates based on the state of a dialog being performed with the user and a policy parameter, and referring to the set scores, selecting one of the response candidates as a dialog act; and (b) a step of obtaining a reward in the state of the dialog using a reward function that, as the reward, returns an evaluation of a behavior performed in a specific circumstance as a quantitatively represented numeric value, and updating the policy parameter based on the obtained reward.

Advantageous Effects of the Invention

As described above, according to the invention, it is possible to adapt to creation of a policy corresponding to operating circumstances.

EXAMPLE EMBODIMENT

Example Embodiment

Following is a description of a dialog apparatus, a dialog method, and a program according to an example embodiment of the invention, with reference to FIGS. 1 to 14.

[Apparatus Configuration]

Figure 1:
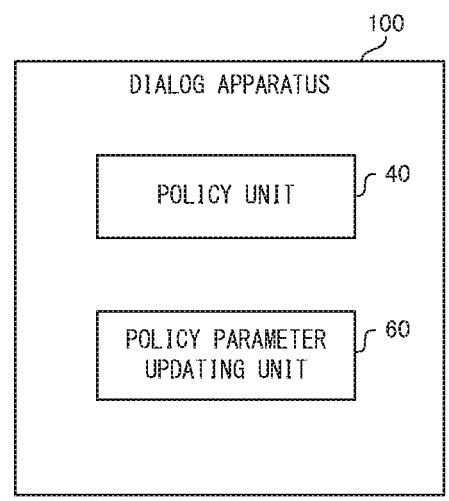
FIG. 1 is a block diagram showing a schematic configuration of a dialog apparatus according to an example embodiment of the invention.

First, the configuration of the dialog apparatus according to this example embodiment will be described. FIG. 1 is a block diagram showing a schematic configuration of the dialog apparatus according to an example embodiment of the invention.

A dialog apparatus 100 according to this example embodiment, shown in FIG. 1, is an apparatus that responds to a dialog act of a user. As shown in FIG. 1, the dialog apparatus 100 includes a policy unit 40 and a policy parameter updating unit 60.

The policy unit 40 first sets a score to each of response candidates included in a set of response candidates based on the state of a dialog being performed with a user and a policy parameter. Next, the policy unit 40, referring to the set scores, selects one of the response candidates as a dialog act of the dialog apparatus 100.

The policy parameter updating unit 60 first obtains a reward in the state of the dialog being performed with the user using a reward function that, as the reward, returns an evaluation of a behavior performed in a specific circumstance as a quantitatively represented numeric value. Next, the policy parameter updating unit 60 updates the policy parameter based on the obtained reward.

In this way, in this example embodiment, the policy parameter for selecting an apparatus dialog act is updated to adapt to a specific circumstance by the policy parameter updating unit 60. Therefore, according to this example embodiment, it is possible to adapt to creation of a policy corresponding to operating circumstances.

Figure 2:
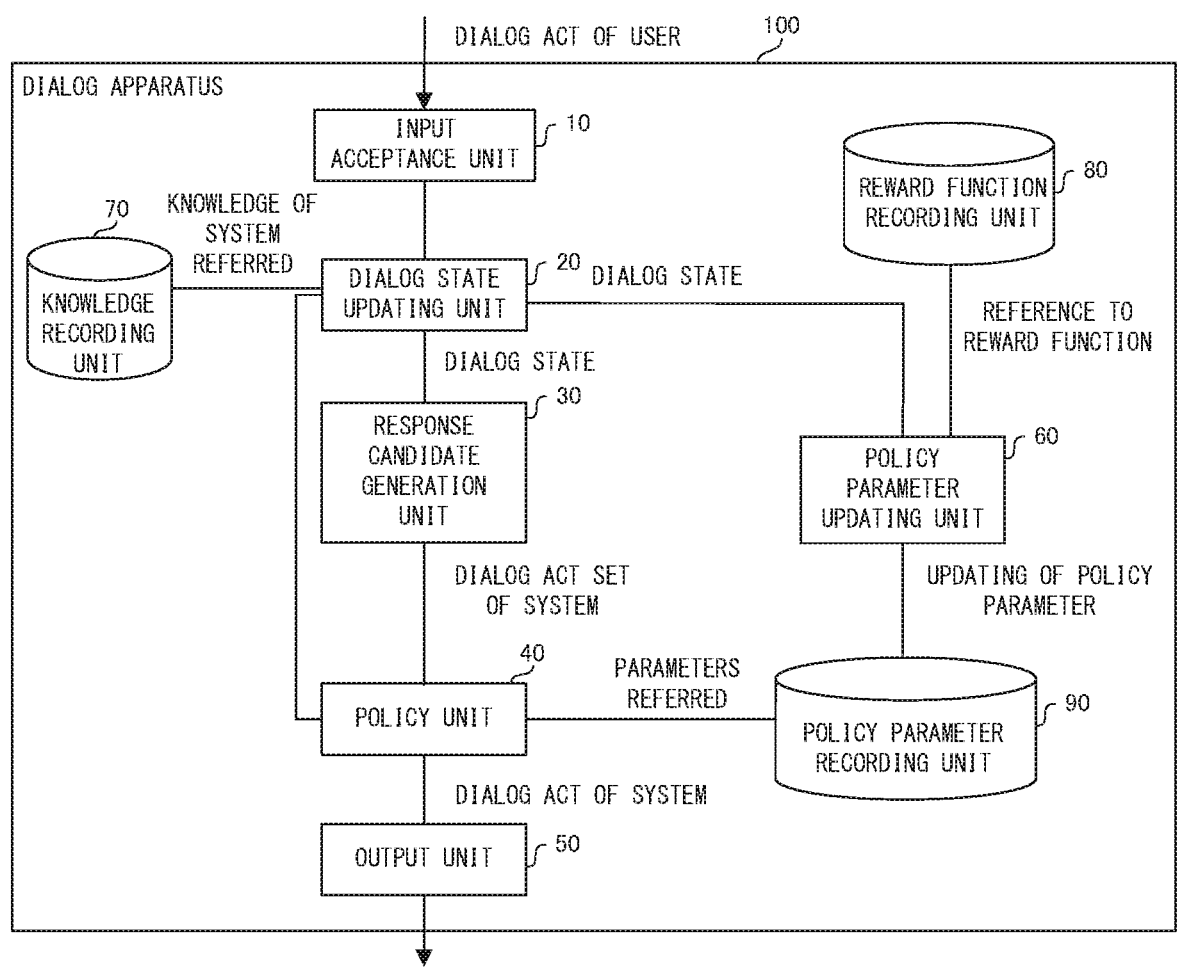
FIG. 2 is a block diagram showing a specific configuration of the dialog apparatus according to an example embodiment of the invention.

Next, the configuration of the dialog apparatus 100 according to this example embodiment will be more specifically described with reference to FIG. 2. FIG. 2 is a block diagram showing a specific configuration of a dialog apparatus according to an example embodiment of the invention.

As shown in FIG. 2, in this example embodiment, in addition to the policy unit 40 and the policy parameter updating unit 60, the dialog apparatus 100 includes an input acceptance unit 10, a dialog state updating unit 20, a response candidate generation unit 30, an output unit 50, a knowledge recording unit 70, a reward function recording unit 80, and a policy parameter recording unit 90.

The input acceptance unit 10 accepts input of a user dialog act (see FIG. 4 described later) from outside. Also, the input acceptance unit 10 transfers the accepted dialog act to the dialog state updating unit 20.

The dialog state updating unit 20 updates the state of the dialog being performed with the user (referred to below as the 'dialog state') based on the user dialog act accepted by the input acceptance unit 10, knowledge being held in advance, and a dialog act that has been output from the policy unit 40 of the dialog apparatus 100 in the past. Then, the dialog state updating unit 20 transfers the updated dialog state to the response candidate generation unit 30, the policy unit 40, and the policy parameter updating unit 60. Also, in this example embodiment, the knowledge used by the dialog state updating unit 20 is stored in the knowledge recording unit 70 (see FIG. 5 described later).

The response candidate generation unit 30 applies a predetermined dialog arrangement to the updated dialog state received from the dialog state updating unit 20, and generates a set of response candidates. The generated response candidates are dialog acts of the dialog apparatus 100. Therefore, in the following description, the set of response candidates may also be referred to as a "dialog act set". The dialog arrangement includes, for example, an inquiry dialog protocol disclosed in the above Non-Patent Document 1.

In this example embodiment, the policy unit 40 performs processing using the dialog state updated by the response candidate generation unit 30. Also, the policy unit 40 encodes the updated dialog state to a vector based on the structure of a logical expression included in the dialog state. Furthermore, the policy unit 40 also encodes the dialog act included in each response candidate included in the set of response candidates to a vector based on the structure of a logical expression included in the dialog act of each response candidate. Then, the policy unit 40 applies the policy parameter, the dialog state after encoding, and the dialog act after encoding to the scoring function to set a score. Note that the encoding and the scoring function will be described later.

Then, the policy unit 40 selects the response candidate with the largest score value, and selects the selected response candidate as the dialog act of the dialog apparatus 100. Also, the policy unit 40 transfers the selected dialog act to the output unit 50. The output unit 50 outputs the received dialog act to a display apparatus, a terminal apparatus of the user, or the like.

The policy parameter is stored in the policy parameter recording unit 90. Also, examples of the policy parameter used in this example embodiment include a parameter of a parametric scoring function used for scoring in the policy unit 40, and a parameter of a parametric function used for encoding of the dialog state and the dialog act in the policy unit 40. Specifically, for example in a case where a neural network is used for the above parametric function (see the reference document cited below), weighting of the neural network is one example of a policy parameter.

(Reference Document) Bishop, Christopher M. "Pattern recognition." Machine Learning 128 (2006): 1-58.

In this example embodiment, the policy parameter updating unit 60 updates the policy parameter stored in the policy parameter recording unit 90. Also, in this example embodiment, the policy parameter updating unit 60 encodes the dialog state updated by the dialog state updating unit 20 to a vector based on the structure of a logical expression included in the dialog state. Afterward, the policy parameter updating unit 60 executes reinforcement learning processing using the dialog state after encoding and the reward obtained from the reward function, and updates the policy parameter. The reward function and the reinforcement learning processing will be described later.

Thus, in this example embodiment, the dialog apparatus 100 causes the policy parameter to be updated such that the numerical value determined by the reward function is maximized, and causes the reward function and the policy parameter to interact with each other. Therefore, behavior adaptation in the policy unit 40 is realized.

[Apparatus Operation]

Figure 3:
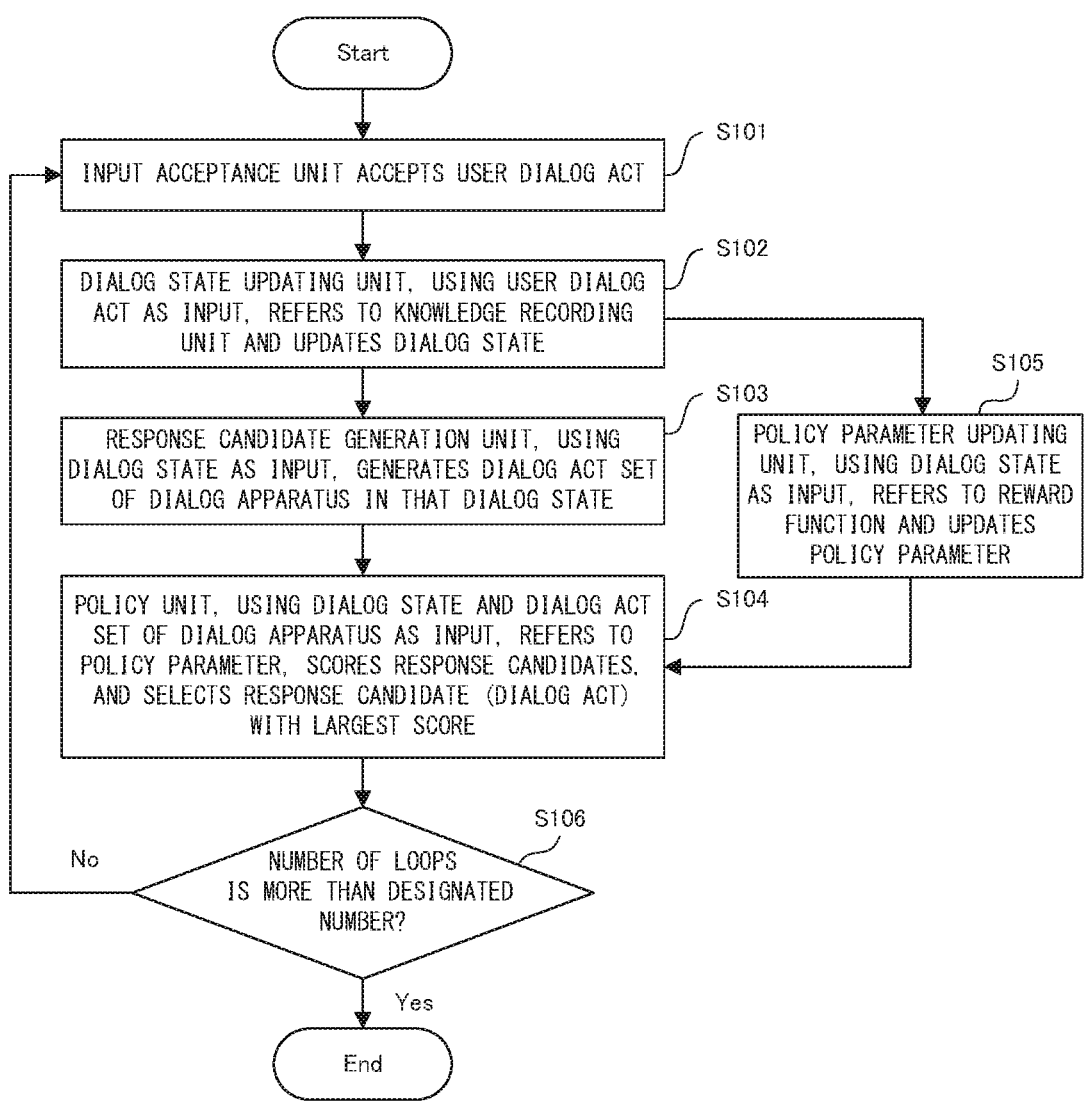
FIG. 3 is a flowchart showing operation of the dialog apparatus according to an example embodiment of the invention.

Next, operation of the dialog apparatus 100 according to an example embodiment of the invention will be described with reference to FIG. 3. FIG. 3 is a flowchart showing operation of a dialog apparatus according to an example embodiment of the invention. The following description refers to FIGS. 1 and 2 as appropriate. Also, in this example embodiment, a dialog method is implemented by operating the dialog apparatus 100. Thus, the description of the dialog method in this example embodiment can be replaced with the description of operation of the dialog apparatus 100 below.

As shown in FIG. 3, first, the input acceptance unit 10 accepts input of a user dialog act (step S101). The input is performed through an input apparatus such as a keyboard, another terminal apparatus, or the like.

Next, the dialog state updating unit 20, using the user dialog act that was accepted in step S101 as input, updates the dialog state based on the knowledge recorded in the knowledge recording unit 70 and a dialog act that has been output from the policy unit 40 of the dialog apparatus 100 in the past (step S102). Also, the dialog state updating unit 20 outputs the updated dialog state to the response candidate generation unit 30, the policy unit 40, and the policy parameter updating unit 60.

Next, the response candidate generation unit 30, using the updated dialog state as input, applies a predetermined dialog arrangement and generates a set of response candidates in that dialog state (a set of dialog acts of the dialog apparatus 100)(step S103).

Also, in parallel with the processing of step S103, the policy parameter updating unit 60, using the dialog state updated in step S102 as input, obtains a reward using the reward function and updates the policy parameter based on the obtained reward (Step S105).

Next, the policy unit 40, using the dialog state updated in step S102 and the dialog action set of the dialog apparatus 100 generated in step S103 as input, furthermore refers to the policy parameter updated in step S105 and sets scores to the response candidates included in the dialog act set. Then, the policy unit 40 selects the response candidate with the largest set score as the dialog act (step S104). The selected dialog act is output by the output unit 50.

Afterward, the policy unit 40 determines whether or not the number of executions of this series of processing steps (the number of loops) is a designated number or more (step S106). When the result of this determination is that the designated number has not been reached, step S101 is executed again, and if the result of this determination is that the number of executions is the designated number or more, processing in the dialog apparatus 100 ends.

[Effects According to Example Embodiment]

As described above, in this example embodiment, the policy parameter updating unit 60 updates the policy parameter so as to adapt to a specific circumstance, and the policy unit 40 selects an appropriate dialog act based on the updated policy parameter. Therefore, according to this example embodiment, the behavior of the policy unit 40 can be optimized according to the operating circumstances, and as a result, an optimal policy is created.

Specific Example

Next, a specific example according to this example embodiment will be described with reference to FIGS. 4 to 13. Also, the description below follows along steps S101 to S105 shown in FIG. 3.

[Step S101]

Figure 4:
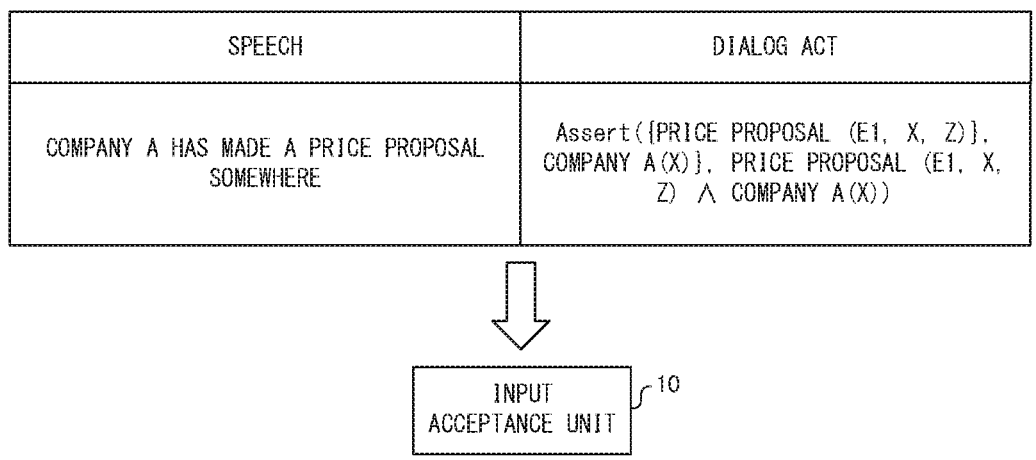
FIG. 4 is a diagram showing an example of the content of processing in step S101 shown in FIG. 3.

FIG. 4 is a diagram showing an example of the content of processing in step S101 shown in FIG. 3. As a specific example, a case is considered in which, as shown in FIG. 4, the input acceptance unit 10 accepts "Assert({price proposal (E1, X, Z)}, price proposal (E1, X, Z)$\land$Company A(X))" as a user dialog act.

The dialog act shown in FIG. 4 abstractly represents a user claim that "Company A has made a price proposal somewhere". The input acceptance unit 10 accepts such a dialog act, and outputs this to the dialog state updating unit 20. Note that specifications of a user dialog act are defined in the above Non-Patent Document 1.

[Step S102]

Figure 5:
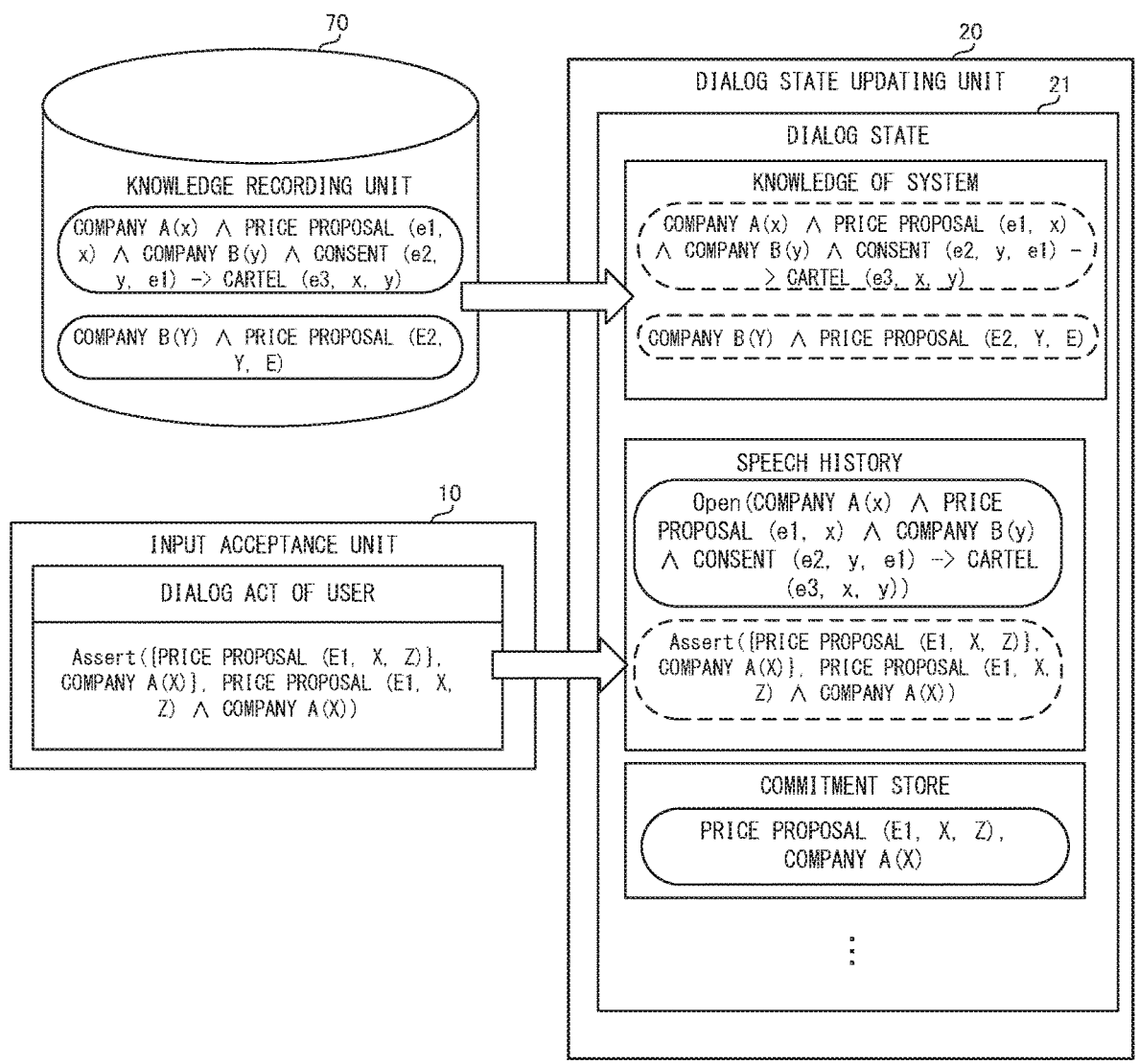
FIG. 5 is a diagram specifically showing an example of the content of processing in step S102 shown in FIG. 3.

FIG. 5 is a diagram specifically showing an example of the content of processing in step S102 shown in FIG. 3. As a specific example, a case is considered in which, as shown in FIG. 5, the dialog state updating unit 20 accepts the user dialog act shown in FIG. 3 as input, and refers to the knowledge recording unit 70.

The dialog state updating unit 20 updates the dialog state based on the knowledge recorded in the knowledge recording unit 70 and the user dialog act accepted as input. In the example shown in FIG. 5, the portions indicated by a broken line are updated portions. The dialog state updating unit 20 updates "system knowledge" in the dialog state with reference to the knowledge recording unit 70, and updates a "speech history" using the user dialog act. Note that a detailed dialog state arrangement is defined in the above Non-Patent Document 1.

The dialog state updating unit 20 updates the dialog state in this way, and then outputs the updated dialog state to the policy unit 40, the policy parameter updating unit 60, and the response candidate generation unit 30.

[Step S103]

Figure 6:
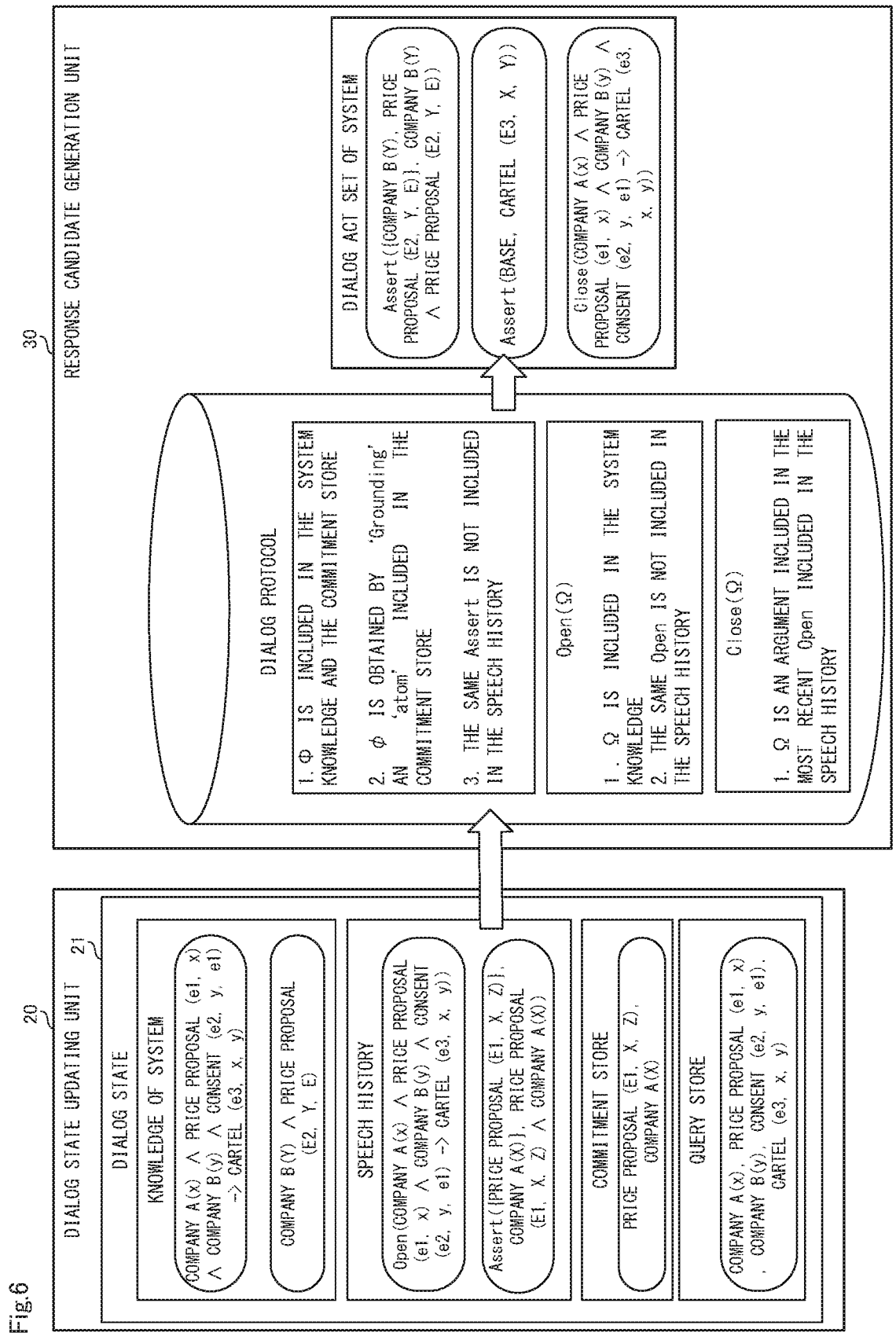
FIG. 6 is a diagram showing an example of the content of processing in step S103 shown in FIG. 3.

FIG. 6 is a diagram showing an example of the content of processing in step S103 shown in FIG. 3. As a specific example, a case is considered in which, as shown in FIG. 6, the response candidate generation unit 30 accepts the dialog state shown in FIG. 5. The response candidate generation unit 30, as a dialog arrangement that has been set in advance, using an inquiry dialog protocol, generates a dialog act set of the dialog apparatus 100 according to the dialog state based thereon.

In the example of FIG. 6, the response candidate generation unit 30 first refers to "Ω is an argument included in the most recent Open included in the speech history" in the inquiry dialog protocol. In the dialog act set of the dialog apparatus 100, the response candidate generation unit 30 also includes Close, which has the argument "Company A(x)∧price proposal (e1, x)∧Company B(y)∧consent (e2, y, e1)->cartel (e3, x, y)" of the most recent Open also in the "speech history" of the dialog state. Note that a detailed description of the inquiry dialog protocol is disclosed in the above Non-Patent Document 1.

[Step S104]

Figure 7:
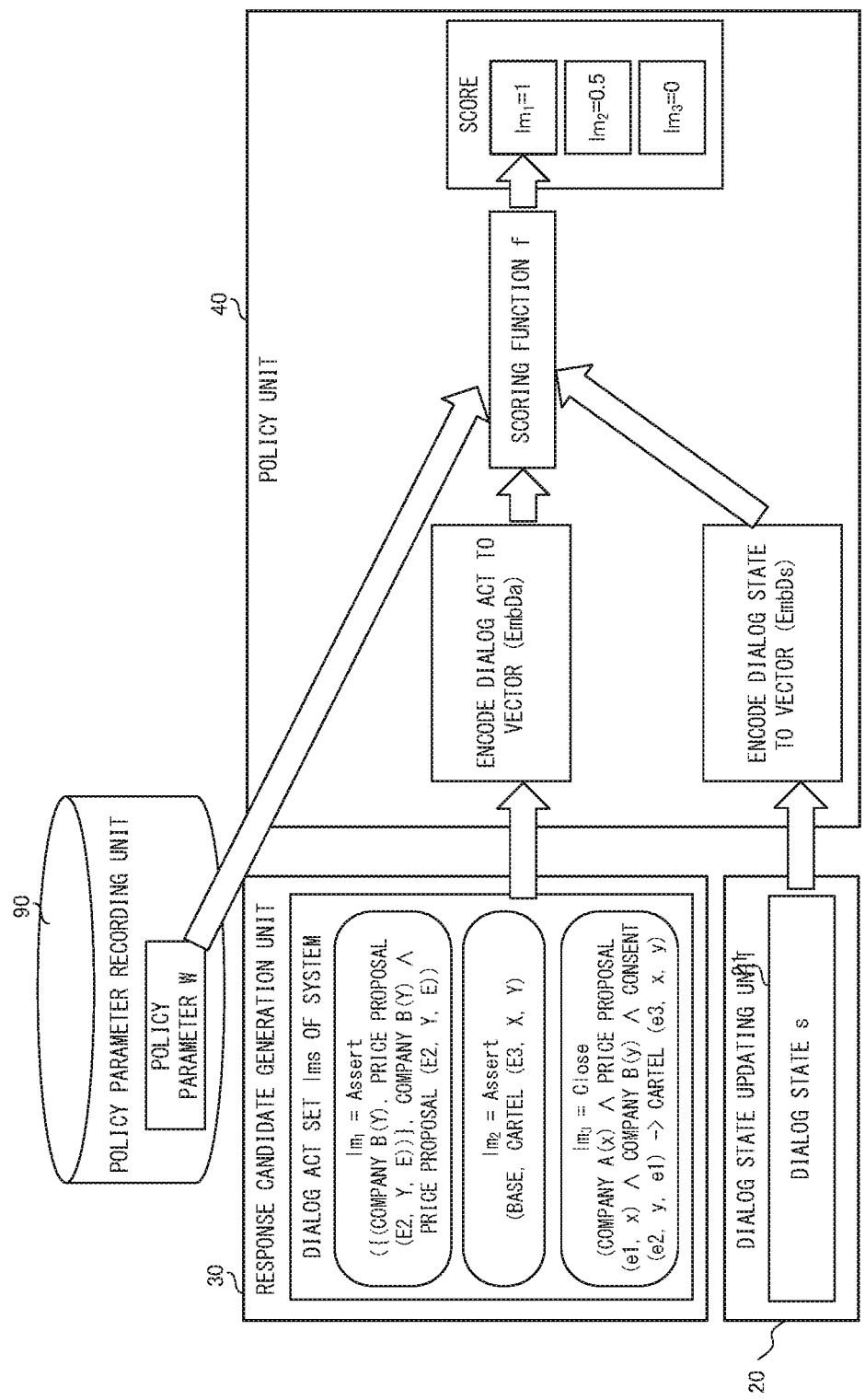
FIG. 7 is a diagram showing an example of the content of processing in step S104 shown in FIG. 3.

FIG. 7 is a diagram showing an example of the content of processing in step S104 shown in FIG. 3. As a specific example, a case is considered in which, as shown in FIG. 7, the policy unit 40 accepts the dialog state shown in FIG. 6 and the dialog act set of the dialog apparatus 100, and refers to the policy parameter shown in FIG. 6. The adaptive policy unit 40 performs scoring of dialog acts based on the policy parameter and the dialog state, and outputs the dialog act with the largest score.

In the example of FIG. 7, the policy unit 40 assigns a score of "1" to the dialog act "Assert({(Company B(Y), price proposal (E2, Y, E))}, Company B(Y)∧price proposal (E2, Y, E))" ($lm_1$), and assigns a score of "0.5" to the dialog act "Assert(base, cartel (E3, X, Y)" ($lm_2$). Also, the policy unit 40 assigns a score of "0" to the dialog act "Close(Company A(x)∧price proposal (e1, x)∧Company B(y)∧consent (e2, y, e1)->cartel (e3, x, y)" ($lm_3$).

In this case, the score is largest for the dialog act "Assert({(Company B(Y), price proposal (E2, Y, E))}, Company B(Y)∧price proposal (E2, Y, E))" ($lm_1$). Therefore, the policy unit 40 selects the dialog act "Assert({(Company B(Y), price proposal (E2, Y, E))}, Company B(Y)∧price proposal (E2, Y, E))" ($lm_1$) as the dialog act of the dialog apparatus 100.

Also, in the selection of the dialog act of the dialog apparatus 100, the dialog state and the response candidate (the dialog act) included in the dialog act set are encoded to a numerical value vector, and scoring is implemented using that vector, the policy parameter, and a scoring function f. A specific example of the scoring function f and the encoding (EmbDa, EmbDs) used in this scoring will be described later.

[Step S105]

Figure 8:
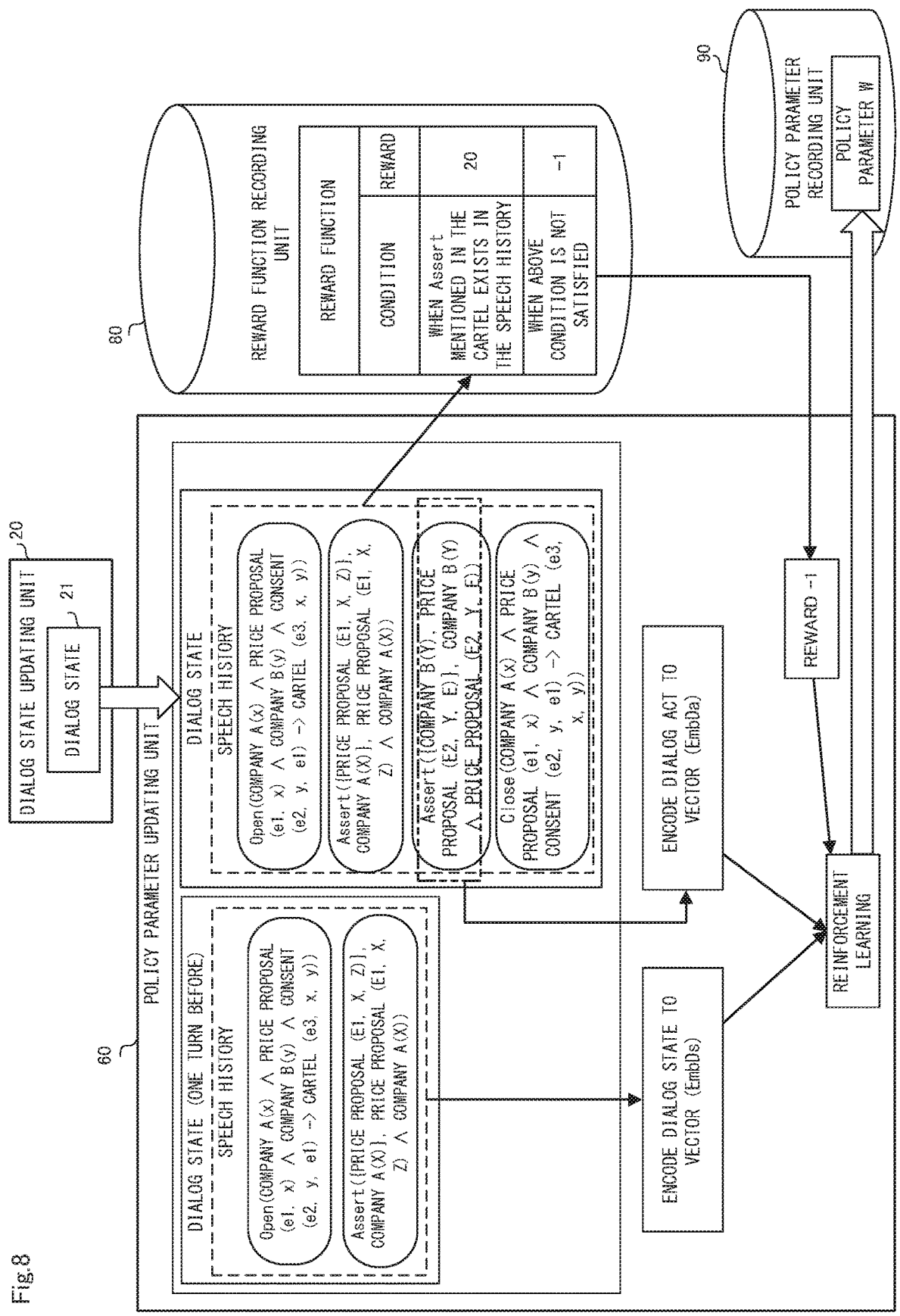
FIG. 8 is a diagram showing an example of the content of processing in step S105 shown in FIG. 3.

FIG. 8 is a diagram showing an example of the content of processing in step S105 shown in FIG. 3. As a specific example, a case is considered in which, as shown in FIG. 8, the policy parameter updating unit 60 accepts the dialog state, and performs reinforcement learning with reference to the reward function. The policy parameter updating unit 60 updates a policy parameter W by implementing reinforcement learning using the vector that represents the dialog state, the policy parameter, and the reward obtained from the reward function.

Specifically, the policy parameter updating unit 60 saves the dialog state at a certain point in time and the dialog state one turn before that time, and encodes them to a vector based on a method described later. Also, the policy parameter updating unit 60 refers to the reward function to obtain a reward. In the example shown in FIG. 8, as the reward function, a function is used that returns one of two types of rewards according to the dialog state. In the example shown in FIG. 8, the dialog state does not apply to a condition "when Assert mentioned in the cartel exists in the speech history", so a reward of "−1" is returned.

Also, in the example shown in FIG. 8, the policy parameter updating unit 60 updates the policy parameter W using, in particular, a Deep Q-Network as an algorithm for the reinforcement learning processing. Technical details of the Deep Q-Network are disclosed in Reference Document 1 cited below.

(Reference Document 1) Mnih, Volodymyr, et al. "Human-level control through deep reinforcement learning." Nature 518.7540 (2015): 529-533.

Incidentally, in the above specific example of steps S104 and S105, the dialog state and the dialog act (the response candidate) are encoded to a vector, and scoring is performed using a scoring function. Here, this processing will be described by way of a specific example with reference to FIGS. 9 to 12.

Figure 9:
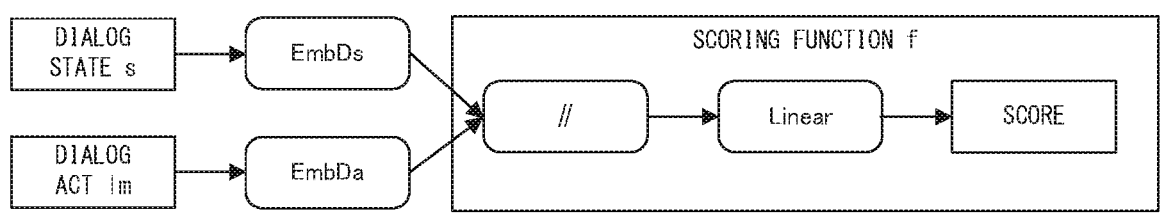
FIG. 9 is a diagram showing an example of a scoring function used in step S104 shown in FIG. 3.

FIG. 9 is a diagram showing an example of the scoring function used in step S104 shown in FIG. 3. In FIG. 9, rectangular nodes on the left side represent data. Arrows represent the flow of data. The dialog state is represented by s, the dialog act is represented by lm, and the score of the dialog act is represented by "score".

Also, in FIG. 9, rectangular nodes with rounded corners represent functions. "EmbDs" is a function that encodes a dialog state. Also, "EmbDa" is a function that encodes a dialog act. The scoring function is represented by "f". A function that combines vectors is represented by "∥". A function that returns a weighted linear sum of each element of an input vector is represented by "Linear (linear function)".

Figure 10:
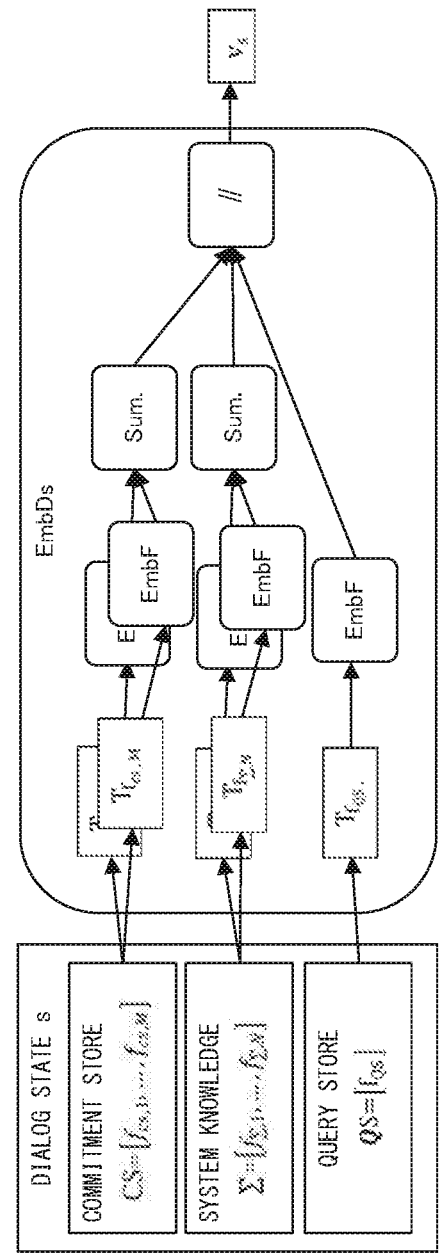
FIG. 10 is a diagram showing an implementation example of a function EmbDs shown in FIG. 9.

FIG. 10 is a diagram showing an implementation example of the function EmbDs shown in FIG. 9. As shown in FIG. 10, the function EmbDs accepts the dialog state s as an input and returns a vector representation $v_s$ of that dialog state s. In FIG. 10, square nodes represent data, and square nodes with rounded corners represent functions. Also, the dialog state s is represented by a commitment store CS, system knowledge Σ, and a query store QS. These are represented as a list of logical expressions.

In FIG. 10, "Sum." is a function that returns the element-by-element sum of the input vector. "||" is a function that returns a combination of input vectors. Also, "EmbF" is a function that returns a vector corresponding to an abstract syntax tree $T_f$ of a logical expression. Details of the function EmbF and the abstract syntax tree of the logical expression will be described later.

Figure 11:
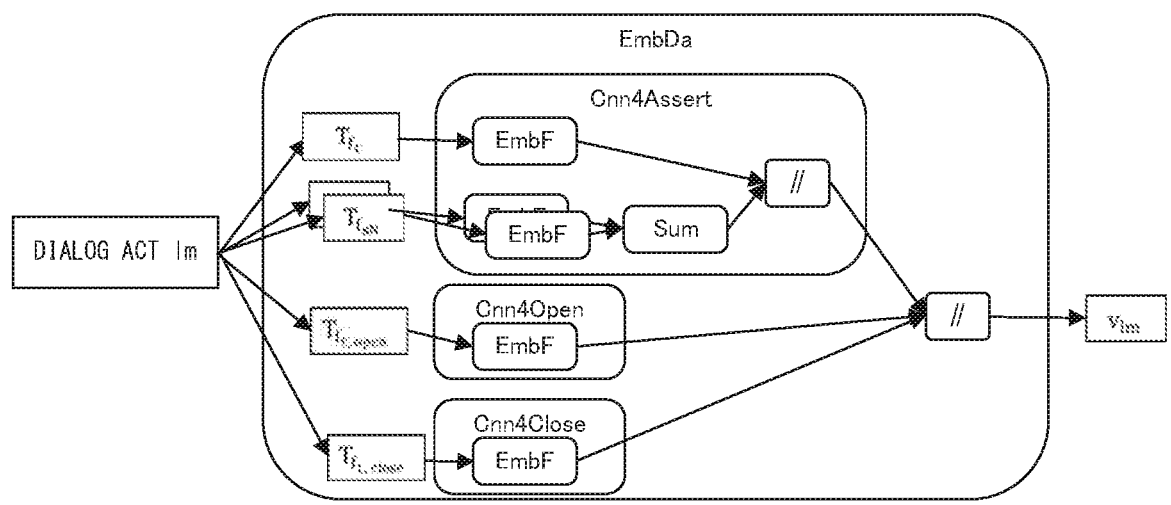
FIG. 11 is a diagram showing an implementation example of a function EmbDa shown in FIG. 9.

FIG. 11 is a diagram showing an implementation example of the function EmbDa shown in FIG. 9. As shown in FIG. 11, the function EmbDa accepts a dialog act lm as an input and returns a vector representation $v_{lm}$ of this dialog act lm. In FIG. 11, square nodes represent data, and square nodes with rounded corners represent functions. Also, the respective nodes shown in FIG. 11 are similar to those in the example shown in FIG. 10.

Figure 12:
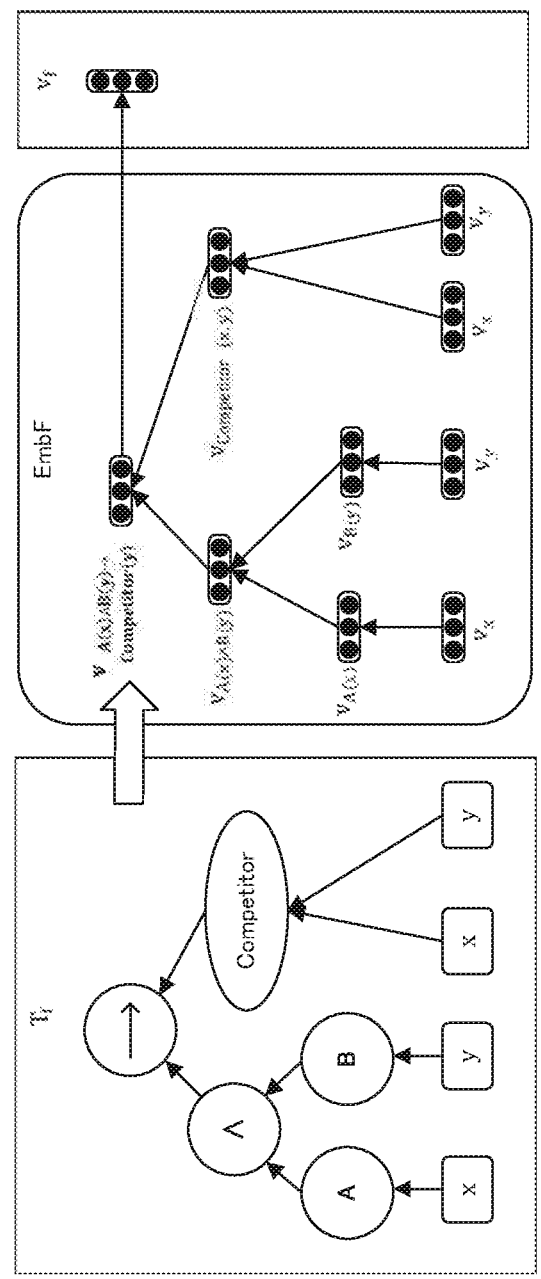
FIG. 12 is a diagram showing an implementation example of a function EmbF shown in FIGS. 10 and 11.

FIG. 12 is a diagram showing an implementation example of the function EmbF shown in FIGS. 10 and 11. In the example shown in FIG. 12, a vector corresponding to the logical expression "A(x)∧B(y)->Competitor (x, y)" is obtained. In the abstract syntax tree $T_f$ corresponding to the logical expression f, a branch corresponds to either a logical operator or a predicate. A leaf represents an argument of a predicate. $V_f$ is a vector representation corresponding to $T_f$. Processing that obtains a vector corresponding to this abstract syntax tree is performed according to a Recursive Neural Network disclosed in Reference Document 2 cited below.

(Reference Document 2) Socher, Richard, et al. "Parsing natural scenes and natural language with recursive neural networks." Proceedings of the 28th international conference on machine learning (ICML-11). 2011.

(Evaluation)

Next, a performance evaluation was performed for a case where the inquiry dialog was performed respectively according to the policy adapted according to the above-described specific example (DQNwE-5d), and the policy proposed in the above Non-Patent Document 1 (Baseline). The Baseline policy follows static rules created by the author of Non-Patent Document 1. As an experiment of the performance evaluation, a dialog simulation of each policy and a user was performed assuming an inquiry dialog domain that estimates whether or not a condition "compliance violation due to mail exchange between companies" is satisfied.

The performance evaluation was performed using a task achievement rate within 20 turns (the rate at which the policy can output a specific dialog act; Success Rate). In this performance evaluation, a policy is considered to be better when the policy is able to accomplish a task in the shortest possible turns.

In order to calculate the task achievement rate, 2000 dialogs with different initial values of the knowledge stored in the knowledge recording unit 70 were implemented. The Baseline policy is created with a focus only on achieving the task, and does not consider the goal of achieving the task in the shortest possible turns. Therefore, the policy (DQNwE-5d) adapted using the invention can be expected to realize a certain task achievement rate in shorter turns than the Baseline policy. In the next paragraph, the results of this evaluation are described with reference to FIG. 13.

Figure 13:
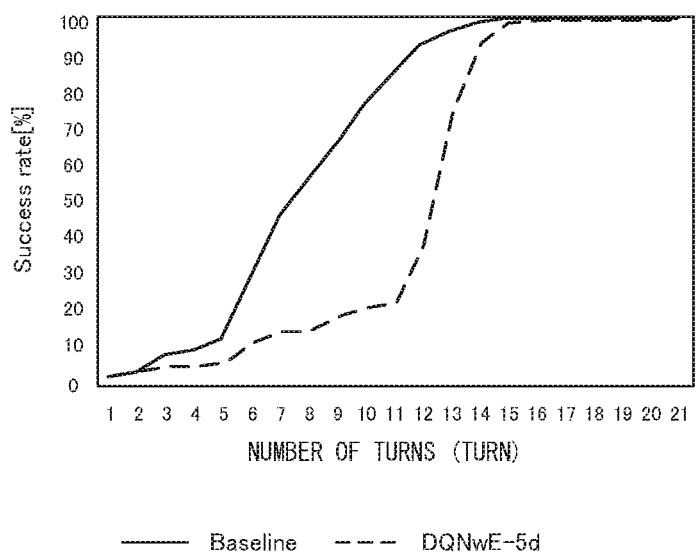
FIG. 13 is a diagram showing results of an evaluation performed in a specific example of an example embodiment of the invention.

FIG. 13 is a diagram showing results of the evaluation performed in this specific example of an example embodiment of the invention. As shown in FIG. 13, from the evaluation results, it is clear that the policy (DQNwE-5d) adapted using this specific example was able to realize a certain task achievement rate in shorter turns than the Baseline policy. Accordingly, it is suggested that the policy generated based on this specific example is better able to adapt to circumstances where the dialog apparatus is placed than a policy following static rules considered manually in advance.

[Program]

A program according to an example embodiment of the invention may be a program that causes a computer to execute steps S101 to S106 shown in FIG. 3. By installing this program in a computer and executing the program, the dialog apparatus 100 and the dialog method according to this example embodiment can be realized. In this case, a central processing unit (CPU) of the computer performs processing to function as the input acceptance unit 10, the dialog state updating unit 20, the response candidate generation unit 30, the policy unit 40, the output unit 50, and the policy parameter updating unit 60.

Also, in this example embodiment, the knowledge recording unit 70, the reward function recording unit 80, and the policy parameter recording unit 90 are realized by storing data files used to configure these units in a storage apparatus such as a hard disk provided in a computer, or these units are realized by mounting a recording medium where the data files are stored to a reading apparatus connected to a computer.

Also, the program according to this example embodiment may be executed by a computer system constructed using a plurality of computers. In this case, for example, each computer may function as any of the input acceptance unit 10, the dialog state updating unit 20, the response candidate generation unit 30, the policy unit 40, the output unit 50, and the policy parameter updating unit 60. Also, the knowledge recording unit 70, the reward function recording unit 80, and the policy parameter recording unit 90 may be constructed on a computer other than the computer that executes the program according to this example embodiment.

Figure 14:
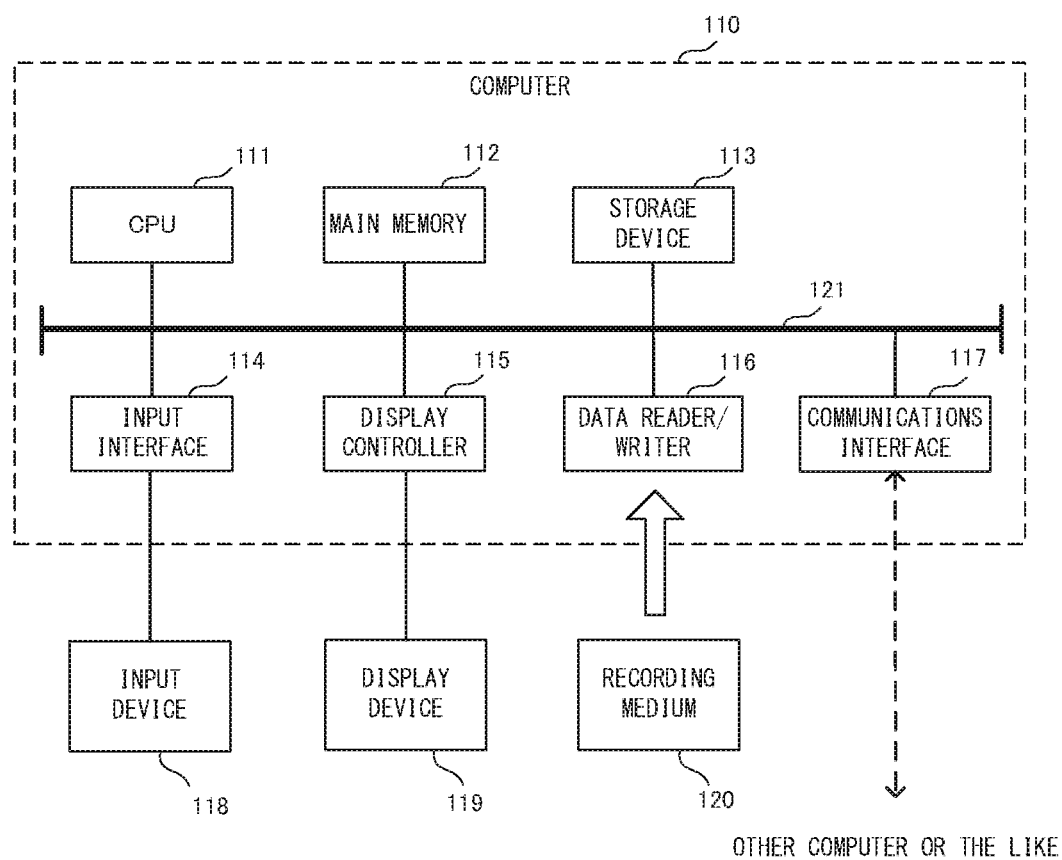
FIG. 14 is a block diagram showing an example of a computer that realizes the dialog apparatus according to an example embodiment of the invention.
Figure 15:
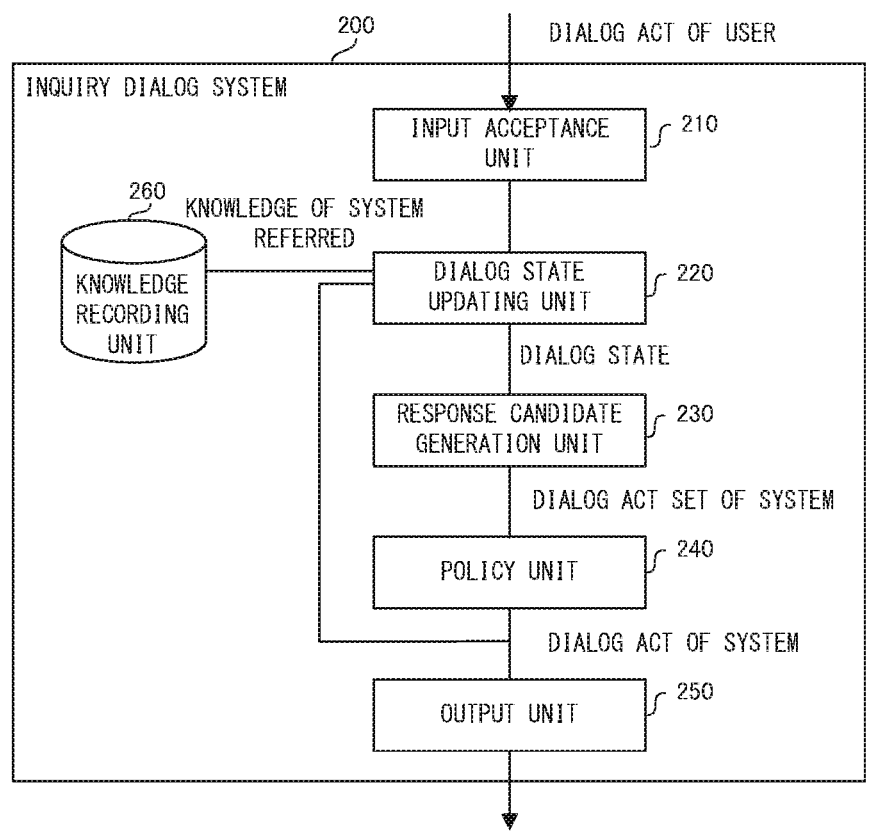
FIG. 15 is a block diagram showing an example of a conventional inquiry dialog system.

Here, a computer that realizes the dialog apparatus 100 by executing the program according to this example embodiment will be described with reference to FIG. 14. FIG. 14 is a block diagram showing an example of a computer that realizes a dialog apparatus according to an example embodiment of the invention.

As shown in FIG. 14, the computer 110 includes a CPU 111, a main memory 112, a storage device 113, an input interface 114, a display controller 115, a data reader/writer 116, and a communications interface 117. These units are each connected so as to be capable of performing data communications with each other through a bus 121.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display by the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Note that the dialog apparatus 100 according to this example embodiment can be realized not only by a computer with a program installed, but also by using hardware corresponding to each part. Further, a configuration may be adopted in which a portion of the dialog apparatus 100 is realized by a program, and the remaining portions are realized by hardware.

Some portion or all of the example embodiments described above can be realized according to (supplementary note 1) to (supplementary note 12) described below, but the below description does not limit the invention.

(Supplementary Note 1)

A dialog apparatus for responding to a dialog act of a user, the dialog apparatus including:

a policy unit configured to set a score to each of response candidates included in a set of response candidates based on the state of a dialog being performed with the user and a policy parameter, and referring to the set scores, to select one of the response candidates as a dialog act of the apparatus; and a policy parameter updating unit configured to obtain a reward in the state of the dialog using a reward function that, as the reward, returns an evaluation of a behavior performed in a specific circumstance as a quantitatively represented numeric value, and to update the policy parameter based on the obtained reward.

(Supplementary Note 2)

The dialog apparatus according to supplementary note 1, wherein the policy unit encodes the state of the dialog and the response candidates included in the set of response candidates to vectors based on the structure of a logical expression that each includes, and sets the score using the state of the dialog after encoding and the response candidates after encoding.

(Supplementary Note 3)

The dialog apparatus according to supplementary note 1 or 2, wherein the policy parameter updating unit encodes the state of the dialog to a vector based on the structure of a logical expression that the dialog includes, executes reinforcement learning processing using the state of the dialog after encoding and the obtained reward, and updates the policy parameter.

(Supplementary Note 4)

The dialog apparatus according to any of supplementary notes 1 to 3, further including:

an input acceptance unit configured to accept input of a dialog act of a user;

a dialog state updating unit configured to update the state of a dialog being performed with the user based on an accepted dialog act, knowledge being held in advance, and a dialog act that has been output from the apparatus in the past; and a response candidate generation unit configured to apply a predetermined dialog arrangement to the updated dialog state, and generates a set of the response candidates.

(Supplementary Note 5)

A dialog method of responding to a dialog act of a user, the dialog method including:

(a) a step of setting a score to each of response candidates included in a set of response candidates based on the state of a dialog being performed with the user and a policy parameter, and referring to the set scores, selecting one of the response candidates as a dialog act; and (b) a step of obtaining a reward in the state of the dialog using a reward function that, as the reward, returns an evaluation of a behavior performed in a specific circumstance as a quantitatively represented numeric value, and updating the policy parameter based on the obtained reward.

(Supplementary Note 6)

The dialog method according to supplementary note 5, wherein, in the (a) step, the state of the dialog and the response candidates included in the set of response candidates are encoded to vectors based on the structure of a logical expression that each includes, and the score is set using the state of the dialog after encoding and the response candidates after encoding.

(Supplementary Note 7)

The dialog method according to supplementary note 5 or 6, wherein, in the (b) step, the state of the dialog is encoded to a vector based on the structure of a logical expression that the dialog includes, reinforcement learning processing is executed using the state of the dialog after encoding and the obtained reward, and the policy parameter is updated.

(Supplementary Note 8)

The dialog method according to any of supplementary notes 5 to 7, further including:

(c) a step of accepting input of a dialog act of a user;

(d) a step of updating the state of a dialog being performed with the user based on an accepted dialog act, knowledge being held in advance, and a dialog act that has been output from the apparatus in the past; and (e) a step of applying a predetermined dialog arrangement to the updated dialog state, and generating a set of the response candidates.

(Supplementary Note 9)

A computer-readable recording medium that includes a program recorded thereon for causing a computer to respond to a dialog act of a user, the program including instructions that cause the computer to carry out:

(a) a step of setting a score to each of response candidates included in a set of response candidates based on the state of a dialog being performed with the user and a policy parameter, and referring to the set scores, selecting one of the response candidates as a dialog act; and (b) a step of obtaining a reward in the state of the dialog using a reward function that, as the reward, returns an evaluation of a behavior performed in a specific circumstance as a quantitatively represented numeric value, and updating the policy parameter based on the obtained reward.

(Supplementary Note 10)

The computer readable recording medium according to supplementary note 9, wherein, in the (a) step, the state of the dialog and the response candidates included in the set of response candidates are encoded to vectors based on the structure of a logical expression that each includes, and the score is set using the state of the dialog after encoding and the response candidates after encoding.

(Supplementary Note 11)

The computer readable recording medium according to supplementary note 9 or 10, wherein, in the (b) step, the state of the dialog is encoded to a vector based on the structure of a logical expression that the dialog includes, reinforcement learning processing is executed using the state of the dialog after encoding and the obtained reward, and the policy parameter is updated.

(Supplementary Note 12)

The computer readable recording medium according to any of the supplementary notes 9 to 11, wherein the program further includes an instruction that causes the computer to carry out:

(c) a step of accepting input of a dialog act of a user;

(d) a step of updating the state of a dialog being performed with the user based on an accepted dialog act, knowledge being held in advance, and a dialog act that has been output from the apparatus in the past; and (e) a step of applying a predetermined dialog arrangement to the updated dialog state, and generating a set of the response candidates.

Although the present invention is described above with reference to example embodiments, the present invention is not limited by the above example embodiments. Within the scope of the present invention, various modifications understandable by those skilled in the art can be made to the configurations or details of the present invention.

INDUSTRIAL APPLICABILITY

As described above, according to the invention, in an inquiry dialog system, it is possible to adapt to creation of a policy corresponding to operating circumstances. The invention is useful in a system that performs discussion with a user and outputs an answer to a given question. More specifically, the invention is useful in an information recommendation system, a question response system, a security analysis system, or the like.

DESCRIPTION OF REFERENCE SIGNS

10 Input acceptance unit
20 Dialog state updating unit
30 Response candidate generation unit
40 Policy unit
50 Output unit
60 Policy parameter updating unit
70 Knowledge recording unit
80 Reward function recording unit
90 Policy parameter recording unit
100 Dialog apparatus
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A dialog apparatus for responding to a dialog act of a user, in a system performing inquiry dialog with the user, the dialog act of a user is performed by the user inputting a logical expression, the dialog apparatus comprising:

at least one memory storing instructions; and at least one processor configured to execute the instructions to:

accept the logical expression as the dialog act of the user, when the user inputs the logical expression;

update knowledge and speech history in a latest system as an updated state of a dialog between the user and the dialog apparatus, based on the accepted dialog act, knowledge being held in advance, and a dialog act that has been output from the dialog apparatus in the past;

apply a predetermined dialog arrangement to the updated state of the dialog and generate a dialog act set consisting of multiple response candidates;

set a score to each of response candidates constituting the dialog act set based on the updated state of the dialog being performed with the user and the dialog apparatus, and a policy parameter, and refer to the set scores, to select one of the response candidates as a dialog act; and obtain a reward in the updated state of the dialog using a reward function that, as the reward, returns an evaluation of a behavior performed in a specific circumstance as a quantitatively represented numeric value, and update the policy parameter based on the obtained reward.

2. The dialog apparatus according to claim 1, wherein the knowledge and the knowledge being held in advance, the dialog act that has been output from the dialog apparatus in the past, the updated state of the dialog, and each of the response candidates constituting the dialog act set are represented by logical expression, and the at least one processor is further configured to execute the instructions to:

encode the updated state of the dialog and each of the response candidates constituting the dialog act set to vectors based on a structure of a logical expression representing the updated state of the dialog and a structure of the logical expression representing a response candidate, and set a score for each of the response candidates constituting the dialog act set using the vectors obtained by encoding and the policy parameter.

3. The dialog apparatus according to claim 1, wherein the policy parameter is machine learning model weights, and the at least one processor is further configured to execute the instructions to:

encode the updated state of the dialog to a vector based on a structure of a logical expression that is representing the updated state of the dialog, execute reinforcement learning processing using the updated state of the dialog encoded in the vector and the obtained reward, and update the policy parameter.

4. A dialog method of responding to a dialog act of a user, in a system performing inquiry dialog with the user, the dialog act of a user is performed by the user inputting a logical expression, the dialog method comprising:

accepting the logical expression as the dialog act of the user, when the user inputs the logical expression;

updating knowledge and speech history in a latest system as an updated state of a dialog between the user and a dialog apparatus, based on the accepted dialog act, knowledge being held in advance, and a dialog act that has been output from the dialog apparatus in the past;

applying a predetermined dialog arrangement to the updated state of the dialog and generate a dialog act set consisting of multiple response candidates;

setting a score to each of response candidates constituting the dialog act set based on the updated state of the dialog being performed with the user and the dialog apparatus, and a policy parameter, and referring to the set scores, to select one of the response candidates as a dialog act; and obtaining a reward in the updated state of the dialog using a reward function that, as the reward, returns an evaluation of a behavior performed in a specific circumstance as a quantitatively represented numeric value, and updating the policy parameter based on the obtained reward.

5. The dialog method according to claim 4, wherein, the knowledge and the knowledge being held in advance, the dialog act that has been output from the dialog apparatus in the past, the updated state of the dialog, and each of the response candidates constituting the dialog act set are represented by logical expression, and the method further comprises:

encoding the updated state of the dialog and each of the response candidates constituting the dialog act set to vectors based on a structure of a logical expression representing the updated state of the dialog and a structure of the logical expression representing a response candidate, and setting a score for each of the response candidates constituting the dialog act set using the vectors obtained by encoding and the policy parameter.

6. The dialog method according to claim 4, wherein the policy parameter is machine learning model weights, and the method further comprises:

encoding the updated state of the dialog to a vector based on a structure of a logical expression that is representing the updated state of the dialog, executing reinforcement learning processing using the updated state of the dialog encoded in the vector and the obtained reward, and updating the policy parameter.

7. A non-transitory computer-readable recording medium that includes a program recorded thereon for causing a computer to respond to a dialog act of a user, in a system performing inquiry dialog with the user, the dialog act of a user is performed by the user inputting a logical expression, the program including instructions that cause the computer to carry out:

accepting the logical expression as the dialog act of the user, when the user inputs the logical expression;

updating knowledge and speech history in a latest system as an updated state of a dialog between the user and a dialog apparatus, based on the accepted dialog act, knowledge being held in advance, and a dialog act that has been output from the dialog apparatus in the past;

applying a predetermined dialog arrangement to the updated state of the dialog and generate a dialog act set consisting of multiple response candidates;

setting a score to each of response candidates constituting the dialog act set -based on the updated state of the dialog being performed with the user and the dialog apparatus, and a policy parameter, and referring to the set scores, to select one of the response candidates as a dialog act; and obtaining a reward in the updated state of the dialog using a reward function that, as the reward, returns an evaluation of a behavior performed in a specific circumstance as a quantitatively represented numeric value, and updating the policy parameter based on the obtained reward.

8. The non-transitory computer readable recording medium according to claim 7, wherein, the knowledge and the knowledge being held in advance, the dialog act that has been output from the dialog apparatus in the past, the updated state of the dialog, and each of the response candidates constituting the dialog act set are represented by logical expression, and the program further including instructions that cause the computer to carry out:

encoding the updated state of the dialog and each of the response candidates constituting the dialog act set to vectors based on a structure of a logical expression representing the updated state of the dialog and a structure of the logical expression representing a response candidate, and setting a score for each of the response candidates constituting the dialog act set using the vectors obtained by encoding and the policy parameter.

9. The non-transitory computer readable recording medium according to claim 7, wherein the policy parameter is machine learning model weights, and the program further including instructions that cause the computer to carry out:

encoding the updated state of the dialog to a vector based on a structure of a logical expression that is representing the updated state of the dialog, executing reinforcement learning processing using the updated state of the dialog encoded in the vector and the obtained reward, and updating the policy parameter.

* * * * *